US012629931B2

(12) United States Patent
Tere

(10) Patent No.: US 12,629,931 B2
(45) Date of Patent: May 19, 2026

(54) APPARATUS FOR STRETCHING A MESH FOR SCREEN PRINTING

(71) Applicant: Sandesh Vinayak Tere, Palghar District (IN)

(72) Inventor: Sandesh Vinayak Tere, Palghar District (IN)

( * ) Notice: Subject to any disclaimer, the term of this patent is extended or adjusted under 35 U.S.C. 154(b) by 10 days.

(21) Appl. No.: 18/856,857

(22) PCT Filed: May 27, 2022

(86) PCT No.: PCT/IB2022/054997
§ 371 (c)(1),
(2) Date: Oct. 14, 2024

(87) PCT Pub. No.: WO2023/199105
PCT Pub. Date: Oct. 19, 2023

(65) Prior Publication Data

US 2025/0269638 A1 Aug. 28, 2025

(30) Foreign Application Priority Data

Apr. 12, 2022 (IN) ............................. 202221021923

(51) Int. Cl.
*B41F 15/36* (2006.01)

(52) U.S. Cl.
CPC .................................... *B41F 15/36* (2013.01)

(58) Field of Classification Search
CPC ....................................................... B41F 15/36
See application file for complete search history.

(56) References Cited

U.S. PATENT DOCUMENTS 5,235,908 A 8/1993 Froelicher et al.
5,488,901 A * 2/1996 Hruska .................. B41F 15/36 269/1
5,913,263 A 6/1999 Hruska
8,141,855 B2 * 3/2012 McCracken ............ B29C 55/10 425/66
12,138,905 B1 * 11/2024 Losiewicz ............... B41F 15/36
2004/0089169 A1 5/2004 Flatt

FOREIGN PATENT DOCUMENTS

CN 118082367 A * 5/2024 .............. B41F 15/36
JP H03-1945 * 1/1991
JP H03-1945 A 1/1991
JP 7036306 B2 * 3/2022 ............. B29C 55/16
WO WO-2005028216 A1 * 3/2005 ............. B44D 3/185

* cited by examiner

*Primary Examiner* — Christopher E Mahoney
*Assistant Examiner* — Marissa Ferguson-Samreth
(74) *Attorney, Agent, or Firm* — Bridgeway IP Law Group, PLLC; Hyun Woo Shin

(57) ABSTRACT

An apparatus (10) for stretching a mesh for screen printing is provided. The apparatus includes a plurality of linear actuators (20) mounted on a corresponding base (30). The plurality of linear actuators includes a corresponding piston arrangement (40) adapted to move from a retracted position (50) to an elongated position (60) upon actuated by a working fluid. The apparatus also includes one or more clamps (70) operatively coupled to the corresponding piston arrangement. The one or more clamps are adapted to stretch the mesh corresponding to movement of the corresponding piston arrangement, thereby stretching the mesh for screen printing. The mesh is adapted to be stretched over a frame (80) located on the base of the corresponding plurality of linear actuators.

10 Claims, 2 Drawing Sheets

APPARATUS FOR STRETCHING A MESH FOR SCREEN PRINTING

EARLIEST PRIORITY DATE

This application claims priority from a Complete patent application filed in India having Patent Application No. 202221021923, filed on Apr. 12, 2022, and titled AN APPARATUS FOR STRETCHING A MESH FOR SCREEN PRINTING.

FIELD OF INVENTION

Embodiments of the present disclosure relate to the field of screen printers and more particularly to an apparatus for stretching a mesh for screen printing.

BACKGROUND

Screen printing is a printing technique in which a mesh is used to transfer ink or dye onto a substrate, except in areas made impermeable to the ink or dye by a screen printing stencil made of the mesh. The ink or dye may include solvent based inks, UV curable inks, discharge dyes, water based dyes, and plastisol dyes. The mesh is positioned over a frame to obtain a screen for the screen printing. A blade or squeegee is moved across the screen to fill open mesh apertures with the dye, and a reverse stroke causes the mesh to touch the substrate momentarily along a line of contact. The reverse stroke causes the dye to wet the substrate and be pulled out of the mesh apertures as the mesh springs back after the blade has passed. In order to obtain imprints of the dye on the substrate, the mesh may be stretched on the frame. Imprints in different colors may be obtained on the substrate by using different screens along with different colors.

Apparatus currently being used for stretching the mesh over the frame is bulky and difficult to operate. Also, clamping the mesh to the apparatus for stretching the mesh and applying adhesive to the mesh once the mesh is stretched, is laborious due to accessibility issues. Further, force to mass ratio of the apparatus is less since the apparatus is stretching the mesh during a compressive stroke of the apparatus. Additionally, the apparatus fails to provide uniform stretching force around the mesh. Further, the apparatus lacks provision for leveling a frame prior to stretching of the mesh over the frame. Also, the apparatus lacks features to prevent relative motion of the frame with respect to the apparatus thereby undermining the stretching process. Retrofitting the apparatus to obtain higher force to mass ratio is expensive. Also, the apparatus is incapable of preventing formation of wrinkles on the mesh when the mesh is being stretched.

Hence, there is a need for an improved apparatus for stretching a mesh for screen printing to address the aforementioned issue(s).

BRIEF DESCRIPTION

In accordance with an embodiment of the present disclosure, an apparatus for stretching a mesh for screen printing is provided. The apparatus includes a plurality of linear actuators mounted on a corresponding base. The plurality of linear actuators includes a corresponding piston arrangement adapted to move from a retracted position to an elongated position upon actuated by a working fluid. The apparatus also includes one or more clamps operatively coupled to the corresponding piston arrangement. The one or more clamps are adapted to stretch the mesh corresponding to movement of the corresponding piston arrangement, thereby stretching the mesh for screen printing. The mesh is adapted to be stretched over a frame located on the base of the corresponding plurality of linear actuators.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
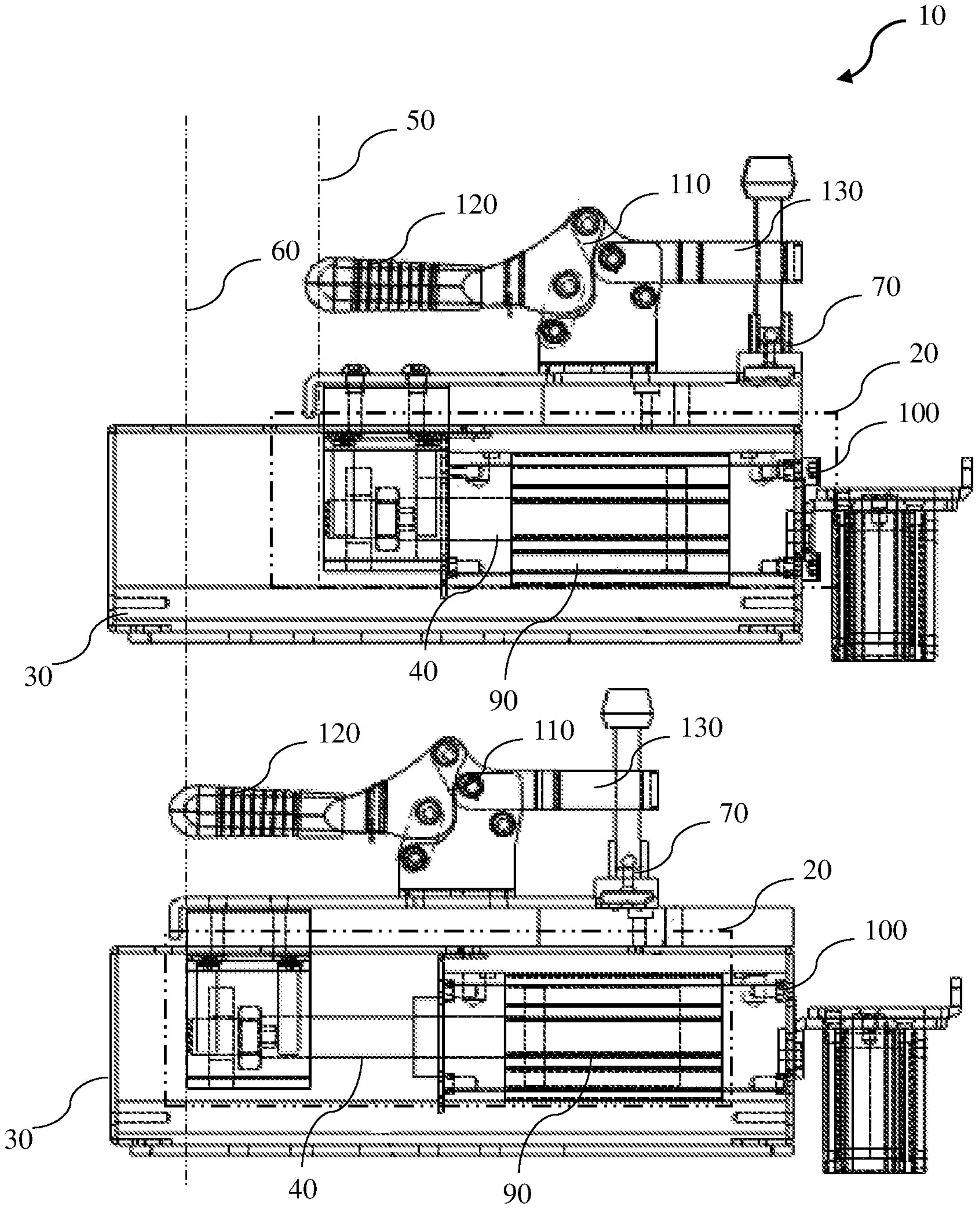
FIG. 1 is a schematic representation of an apparatus for stretching a mesh for screen printing in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to an apparatus for stretching a mesh for screen printing. In accordance with an embodiment of the present disclosure, an apparatus for stretching a mesh for screen printing is provided. The apparatus includes a plurality of linear actuators mounted on a corresponding base. The plurality of linear actuators includes a corresponding piston arrangement adapted to move from a retracted position to an elongated position upon actuated by a working fluid. The apparatus also includes one or more clamps operatively coupled to the corresponding piston arrangement. The one or more clamps are adapted to stretch the mesh corresponding to movement of the corresponding piston arrangement, thereby stretching the mesh for screen printing. The mesh is adapted to be stretched over a frame located on the base of the corresponding plurality of linear actuators.

FIG. 1 is a schematic representation of an apparatus (10) for stretching a mesh for screen printing in accordance with an embodiment of the present disclosure. The apparatus (10) includes a plurality of linear actuators (20) mounted on a corresponding base (30). As used herein, the plurality of linear actuators (20) may be defined as a plurality of actuators provides linear movement upon actuated by a working fluid. In a specific embodiment, the plurality of linear actuators (20) may be coupled to the base (30) via one or more lugs (100). In one embodiment, the plurality of linear actuators (20) may include a pneumatic cylinder (90). In some embodiments, the plurality of linear actuators (20) may include a hydraulic cylinder. In a specific embodiment, the plurality of linear actuators (20) may include a single acting cylinder. In another embodiment, the plurality of linear actuators (20) a double acting cylinder.

Further, in a specific embodiment, each of the plurality of linear actuators (20) may be adapted to be actuated simultaneously. The plurality of linear actuators (20) includes a corresponding piston arrangement (40) adapted to move from a retracted position (50) to an elongated position (60) upon actuated by the working fluid. In one embodiment, the working fluid may include air. In a specific embodiment, the working fluid may include mineral oil. In one embodiment, the working fluid may be in a compressed state. In some embodiments, the working fluid for the plurality of linear actuators (20) may be provided by a centralized source. The apparatus (10) also includes one or more clamps (70) operatively coupled to the corresponding piston arrangement (40). In one embodiment, the one or more clamps (70) may be adapted to clasp the mesh.

Furthermore, in a specific embodiment, the one or more clamps (70) may include a corresponding stationary jaw and a corresponding moving jaw. In such an embodiment, the moving jaw may be rocked about a pivot point (110) by means of a handle (120) and a link (130) associated with the handle (120). In one embodiment, pivoting the handle (120) in a clockwise direction may cause engagement of the moving jaw with the stationary jaw. In such an embodiment, the moving jaw may be disengaged from the stationary jaw upon pivoting the handle (120) in the anti-clockwise direction. In one embodiment, the one or more clamps (70) may include at least one of a dead-center clamp, and a hinge clamp.

Moreover, the one or more clamps (70) are adapted to stretch the mesh corresponding to movement of the corresponding piston arrangement (40), thereby stretching the mesh for screen printing. In a specific embodiment, the one or more clamps (70) may include corrugated rubber surfaces to firmly attach the clamps (70) to the mesh while stretching the mesh. In one embodiment, the mesh may include a mesh. In an exemplary embodiment, mesh count of the mesh may include, but not limited to, 110, 156, 230, 38, 86, 305 and the like.

Additionally, in some embodiments, the mesh may be composed of materials including, but not limited to, nylon, polyester, stainless steel, and the like. In one embodiment, the piston arrangement (40) may be adapted to provide vibrational movement to prevent formation of one or more wrinkles on the mesh. In a specific embodiment, the piston arrangement (40) may be adapted to move from the elongated position (60) to the retracted position (50) by a reaction force provided by one or more springs. Operational arrangement of the plurality of linear actuators (20) and a frame (FIG. 2, 80) is described in detail in FIG. 2.

Figure 2:
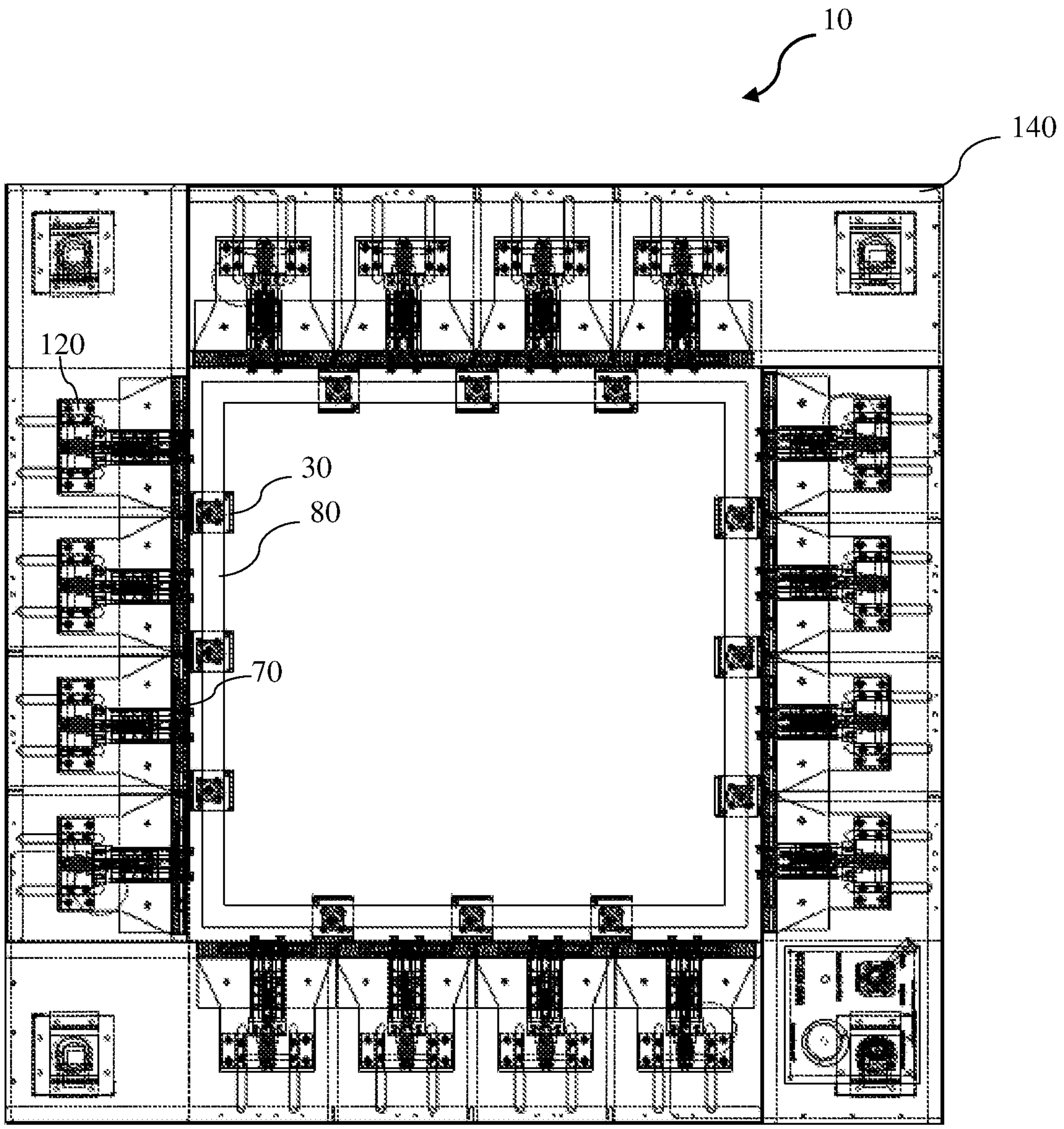
FIG. 2 is a schematic representation of one embodiment of the system of FIG. 1, depicting a top view of operational arrangement of a plurality of linear actuators and a frame in accordance with an embodiment of the present disclosure.

FIG. 2 is a schematic representation of one embodiment of the system of FIG. 1, depicting a top view of operational arrangement of the plurality of linear actuators (20) and the frame in accordance with an embodiment of the present disclosure. The mesh is adapted to be stretched over a frame (80) located on the base (30) of the corresponding plurality of linear actuators (20). In one embodiment, the frame (80) may be composed of materials including, but not limited to, metal, wood, plastic, fibre, and the like. In a specific embodiment, the base (30) may include a height adjustment arrangement adapted to level the frame (80) with respect to the base (30). In such an embodiment, the height adjustment arrangement may include one or more fasteners adapted to adjust a clearance between the frame (80) and the base (30). In some embodiments, the base (30) may include a locking mechanism adapted to prevent relative motion of the frame (80) with respect to the base (30) by locking the frame (80) with the base (30).

Further, operation of the apparatus is described in detail as follows. Initially, the plurality of linear actuators (20) may be positioned on a platform (140) in a rectangular arrangement. A frame (80) may be placed on the corresponding base (30) of the plurality of linear actuators (20). The height adjustment arrangement may level the frame (80) with respect to the base (30) and a locking mechanism may restrict the relative movement of the frame (80) with respect to the base (30). Upon positioning the frame (80) on the base (30) of the corresponding plurality of linear actuators (20), the one or more clamps (70) associated with the corresponding linear actuators (20) are disengaged by pivoting the corresponding handle (120) in an anticlockwise direction.

Furthermore, when the one or more clamps (70) are disengaged, the mesh is introduced between the one or more clamps (70) and the corresponding handle (120) is pivoted in the clockwise direction to enable the one or more clamps (70) to clasp to the mesh. Upon engagement of the one or more clamps (70) on the mesh, compressed air provided by an air source may be provided to the plurality of linear actuators (20). The plurality of linear actuators (20) may move from the retracted position (50) to the elongated position (60) upon actuated by the compressed air thereby stretching the mesh over the frame (80). The mesh stretched over the frame (80) may later affixed to the frame (80) by application of adhesives.

Various embodiments of the apparatus for stretching the mesh for screen printing above enable various advantages. The apparatus is compact and easy to operate. Compactness of the apparatus enables hassle free clamping of the mesh to the apparatus. Compactness of the apparatus also makes application of adhesive to the mesh easy. Force to mass ratio of the apparatus is superior due to stretching of the mesh during an expansion stroke of the apparatus. Simultaneous actuation of the plurality of linear actuators provide uniform stretching force around the mesh.

Further, provision of the height adjustment arrangement provides a way for levelling the frame with respect to the base thereby ensuring accuracy of the screen printing. Provision of the locking mechanism also improves the accuracy of the screen printing by preventing relative movement of the frame with respect to the base. Ability of the piston arrangement to provide vibrational movement during stretching of the mesh prevents formation of the one or more wrinkles on the mesh thereby improving quality of the screen printing.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. An apparatus for stretching a mesh for screen printing, the apparatus comprising:

a plurality of linear actuators mounted on a corresponding base, wherein the plurality of linear actuators comprises a corresponding piston arrangement adapted to:

move from a retracted position to an elongated position upon actuation by a working fluid to stretch the mesh during an expansion stroke and thereby increase force to mass ratio, and provide vibrational movement during stretching of the mesh to prevent formation of one or more wrinkles on the mesh; and one or more clamps operatively coupled to the corresponding piston arrangement, and adapted to;

clasp the mesh by pivoting a corresponding handle that is connected to the one or more clamps, and stretch the mesh corresponding to movement of the corresponding piston arrangement, thereby stretching the mesh for screen printing, wherein the mesh is adapted to be stretched over a frame located on the base of the corresponding plurality of linear actuators, and wherein the base comprises a locking mechanism configured to prevent relative movement of the frame with respect to the base by locking the frame with the base.

2. The apparatus as claimed in claim 1, wherein the plurality of linear actuators comprises a pneumatic cylinder.

3. The apparatus as claimed in claim 1, wherein each of the plurality of linear actuators are adapted to be actuated simultaneously.

4. The apparatus as claimed in claim 1, wherein the piston arrangement is adapted to move from the elongated position to the retracted position by a reaction force provided by one or more springs.

5. The apparatus as claimed in claim 1, wherein the working fluid comprises air.

6. The apparatus as claimed in claim 1, wherein the working fluid for the plurality of linear actuators is provided by a centralized source.

7. The apparatus as claimed in claim 1, wherein the one or more clamps comprises at least one of a dead-center clamp, and a hinge clamp.

8. The apparatus as claimed in claim 1, wherein the base comprises a height adjustment arrangement adapted to level the frame with respect to the base, wherein the height adjustment arrangement comprises one or more fasteners adapted to adjust a clearance between the frame and the base.

9. The apparatus of claim 1, wherein each of the one or more clamps comprises a stationary jaw and a moving jaw, and wherein the one or more clamps are configured to clasp the mesh by:

pivoting the handle in an anti-clockwise direction to disengage the moving jaw from the stationary jaw, placing the mesh between the stationary jaw and the moving jaw, and pivoting the handle in a clockwise direction to engage the moving jaw with the stationary jaw.

10. The apparatus of claim 1, wherein the one or more clamps include corrugated rubber surfaces configured to firmly attach the one or more clamps to the mesh while stretching the mesh.

* * * * *